US012748238B2

(12) United States Patent
Cha et al.

(10) Patent No.: US 12,748,238 B2
(45) Date of Patent: Sep. 29, 2026

(54) METHOD AND APPARATUS FOR ESTIMATING LITHOFACIES BY LEARNING WELL LOGS

(71) Applicants: SK INNOVATION CO., LTD., Seoul (KR); SK EARTHON CO., LTD., Seoul (KR)

(72) Inventors: Seungjoon Cha, Daejeon (KR); Hee Jeong Jang, Daejeon (KR); Youngki Choi, Daejeon (KR); Kyoung Jin Lee, Daejeon (KR); Man Cheol Kim, Gyeonggi-do (KR)

(73) Assignees: SK INNOVATION CO., LTD., Seoul (KR); SK EARTHON CO., LTD., Seoul (KR)

( * ) Notice: Subject to any disclaimer, the term of this patent is extended or adjusted under 35 U.S.C. 154(b) by 419 days.

(21) Appl. No.: 18/418,989

(22) Filed: Jan. 22, 2024

(65) Prior Publication Data

US 2024/0241286 A1 Jul. 18, 2024

Related U.S. Application Data

(63) Continuation-in-part of application No. 17/220,909, filed on Apr. 1, 2021, now abandoned.

(30) Foreign Application Priority Data

Jun. 4, 2020 (KR) ........................ 10-2020-0067931

(51) Int. Cl.
*G01V 20/00* (2024.01)
*E21B 44/00* (2006.01)

(52) U.S. Cl.
CPC .............. *G01V 20/00* (2024.01); *E21B 44/00* (2013.01); *E21B 2200/20* (2020.05); *E21B 2200/22* (2020.05)

(58) Field of Classification Search
CPC .......... G01V 20/00; G01V 9/00; G06N 20/20; G06N 20/00; G06N 3/045; G06N 3/04;
(Continued)

(56) References Cited

U.S. PATENT DOCUMENTS 9,696,442 B2 7/2017 Li et al.
2016/0364654 A1 12/2016 Gevirtz
(Continued)

FOREIGN PATENT DOCUMENTS

CN 103424772 A 12/2013
CN 105488248 A 4/2016

OTHER PUBLICATIONS

CN202110351675 First Office Action dated Dec. 5, 2025, 15 pgs.
(Continued)

*Primary Examiner* — Mohamed Charioui
(74) *Attorney, Agent, or Firm* — IP&T GROUP LLP

(57) ABSTRACT

Disclosed are a method and apparatus for estimating lithofacies by learning well logs. The method includes a model formation step of forming lithofacies estimation model to output lithofacies corresponding to measured depth when the well logs are input based on train data sets including train data having values of multiple factors included in the well logs, the values being arranged corresponding to measured depth, and label data having lithofacies corresponding to measured depth as answers, and lithofacies estimation step of inputting unseen data having values of multiple factors included in well logs acquired from a well at which lithofacies are to be estimated, the values being arranged corresponding to measured depth, to the lithofacies estimation model to estimate lithofacies corresponding to measured depth.

8 Claims, 9 Drawing Sheets

(58) Field of Classification Search
CPC .. G06N 3/02; G06N 3/00; G06N 3/08; G06N 7/01; E21B 47/04; E21B 47/00; E21B 44/00; E21B 2200/22; E21B 2200/00; E21B 41/00; E21B 2200/20; G06F 18/211; G06F 18/21; G06F 18/20; G06F 18/00; G06F 18/217; G06F 18/22; G06F 18/23; G06F 18/24133; G06F 18/241; G06F 18/214
See application file for complete search history.

(56) References Cited

U.S. PATENT DOCUMENTS

| | | | |
|---|---|---|---|
| 2018/0238148 | A1 | 8/2018 | Canady et al. |
| 2019/0368316 | A1 | 12/2019 | Bize-Forest et al. |
| 2020/0065620 | A1 | 2/2020 | Feng et al. |

OTHER PUBLICATIONS

Alizadeh, et al., Artificial neural network modeling and cluster analysis for organic facies and burial history estimation using well log data: A case study of the South Pars Gas Field, Persian Gulf, Iran, Elsevier, pp. 261-269, 2012.
Jaikla, et al., FaciesNet: Machine Learning Applications for Facies Classification in Well Logs, FaciesNet, pp. 1-6, 2019.
Schreilechner, et al., Three Component Seismic Acquisition Implemented for Deep Geothermal Exploration in Vienna, Eage, pp. 1-5, 2017.
Chayawan Jalkla et al., FaciesNet: Machine Learning Applications for Facies Classification in Well Logs, Second Workshop on Machine Learning and the Physical Sciences (NeurIPS 2019), Dec. 8, 2019, pp. 1-6, Vancouver.
Bahram Allzadeh et al., Artificial neural network modeling and cluster analysis for organic facies and burial history estimation using well log data: A case study of the South Pars Gas Field, Persian Gulf, Iran, Computers & Geosciences. Dec. 23, 2011, pp. 261-269, vol. 45, Elsevier.
Office Action for Korean Patent Application No. 10-2020-0067931 issued by the Korean Patent Office on Feb. 19, 2026.

| BOREHOLE A | LATITUDE | 35°N | LONGITUDE | 120°E | DRILLING DATE | 2001.02.03 |
|---|---|---|---|---|---|---|
| MEASURED DEPTH | FIRST FACTOR | SECOND FACTOR | THIRD FACTOR | FOURTH FACTOR | N-TH FACTOR | LITHOFACIES |
| ... | ... | ... | ... | ... | ... | ... |
| 556 | 139.4309 | 95.4477 | 0.488177 | 2.47420 | ... | A |
| 557 | 132.2785 | 92.4123 | 0.392847 | 2.54121 | ... | B |
| 558 | 136.3174 | 98.9740 | 0.344549 | 2.27460 | ... | A |
| 559 | 133.6653 | 93.1445 | 0.391846 | 2.93320 | ... | B |
| 560 | 131.9706 | 94.6851 | 0.328721 | 2.38900 | ... | C |
| ... | ... | ... | ... | ... | ... | ... |

| MEASURED DEPTH | FIRST FACTOR | SECOND FACTOR | THIRD FACTOR | FOURTH FACTOR | N-TH FACTOR | LITHOFACIES |
|---|---|---|---|---|---|---|
| 556 | 139.4309 | 95.4477 | 0.488177 | 2.47420 | ··· | A |
| 557 | 132.2785 | 92.4123 | 0.392847 | 2.54121 | ··· | B |
| 558 | 136.3174 | 98.9740 | 0.344549 | 2.27460 | ··· | A |
| 559 | 133.6653 | 93.1445 | 0.391846 | 2.93320 | ··· | B |
| 560 | 131.9706 | 94.6851 | 0.328721 | 2.38900 | ··· | C |

| MEASURED DEPTH | FIRST FACTOR | SECOND FACTOR | THIRD FACTOR | FOURTH FACTOR | FIFTH FACTOR |
|---|---|---|---|---|---|
| 554 | ... | ... | ... | ... | ... |
| 555 | ... | ... | ... | ... | ... |
| 556 (TARGET) | 139.4309 | 95.4477 | 0.488177 | 2.47420 | ... |
| 557 (TARGET) | 132.2785 | 92.4123 | 0.392847 | 2.54121 | ... |
| 558 (TARGET) | 136.3174 | 98.9740 | 0.344549 | 2.27460 | ... |
| 559 (TARGET) | 133.6653 | 93.1445 | 0.391846 | 2.93320 | ... |
| 560 (TARGET) | 131.9706 | 94.6851 | 0.328721 | 2.38900 | ... |
| 561 | ... | ... | ... | ... | ... |
| 562 | ... | ... | ... | ... | ... |

| MEASURED DEPTH | PROBABILITY OF LITHOFACIES A | PROBABILITY OF LITHOFACIES B | PROBABILITY OF LITHOFACIES C | PROBABILITY OF LITHOFACIES D | PROBABILITY OF LITHOFACIES E | ESTIMATED LITHOFACIES |
|---|---|---|---|---|---|---|
| 556 | 0.01 | 0.04 | 0.79 | 0.11 | 0.05 | C |
| 557 | 0.02 | 0.37 | 0.03 | 0.52 | 0.06 | D |
| 558 | 0.02 | 0.04 | 0.02 | 0.01 | 0.91 | E |
| 559 | 0.83 | 0.07 | 0.08 | 0.01 | 0.01 | A |
| 560 | 0.1 | 0.76 | 0.09 | 0.02 | 0.03 | B |

METHOD AND APPARATUS FOR ESTIMATING LITHOFACIES BY LEARNING WELL LOGS

CROSS REFERENCE TO RELATED APPLICATION

The present application is a continuation-in-part of U.S. patent application Ser. No. 17/220,909, titled, “Method and Apparatus for Estimating Lithofacies by Learning Well Logs, filed on Apr. 1, 2021, which claims priority to Korean Patent Application No. 10-2020-0067931, filed Jun. 4, 2020, the entire contents of which are incorporated herein for all purposes by this reference.

BACKGROUND OF THE INVENTION

Field of the Invention

The present invention relates to a method and apparatus for estimating lithofacies by learning well logs.

Description of the Related Art

Various resources, such as coal, petroleum, natural gas, and minerals, exist under the ground. In order to explore for a possibility of existence of subsurface natural resources, a drilling process in strata is performed to directly inspect the strata. When drilling is performed, it is possible to acquire well logs, which are records of rock properties acquired during a drilling process in the strata.

Various factors included in the well logs may be analyzed to estimate underground lithofacies. Conventionally, a method of a small number of petrophysicists analyzing the well logs and estimating the lithofacies based on their empirical judgment has been used. Manual log analysis by domain experts requires efforts to analyze a huge amount of different data, high costs, and time. Nonetheless high accuracy is not guaranteed and even different results may be derived depending on who analyzed it.

RELATED ART DOCUMENTS

Patent Documents (Patent Document 1) US 2020-0065620 A1

SUMMARY OF THE INVENTION

The objective of the present invention is to provide a method and apparatus for estimating lithofacies using an artificial intelligence model that has learned well logs.

In accordance with an aspect of the present invention, the above and other objects can be accomplished by the provision of a method of estimating lithofacies by learning well logs, the method including:

a model formation step of forming lithofacies estimation model to output lithofacies corresponding to measured depth when the well logs are input based on train data sets including train data having values of multiple factors included in the well logs, the values being arranged corresponding to measured depth, and label data having lithofacies corresponding to measured depth as answers;

lithofacies estimation step of inputting unseen data having values of multiple factors included in well logs acquired from a well at which lithofacies are to be estimated, the values being arranged corresponding to measured depth, to the lithofacies estimation model to estimate lithofacies corresponding to measured depth, where the model formation step and the lithofacies estimation step are driven by a processor, where the model formation step includes:

a train data set generation step of generating train data sets by generating train data having measured values of the multiple factors included in the well logs corresponding to a target measured depth, a measured depth shallower than the target measured depth, and a measured depth deeper than the target measured depth, the measured values being disposed in a two-dimensional array structure, and generating label data having lithofacies at the target measured depth as answers;

a model training step of training lithofacies estimation model having a convolution neural network structure configured to output a probability of the lithofacies at the target measured depth corresponding in kind to the lithofacies included in the label data of the train data sets for each kind of lithofacies using the train data sets and to decide lithofacies having highest probability as an estimated lithofacies, where the two-dimensional array structure includes:

the measured depth located in a first column; and one or more factors located in subsequent columns, where the measured depth is arranged in odd-numbered rows with the target depth placed at the center, and the measured depth is arranged in order, where the lithofacies estimation model learns information about strata at the target measured depth and learns information about strata shallower than the target measured depth and strata deeper than the target measured depth, and where the lithofacies estimation step includes:

a unseen data generation step of generating unseen data having measured values of the multiple factors included in the well logs corresponding to the target measured depth, the measured depth shallower than the target measured depth, and the measured depth deeper than the target measured depth, the measured values being disposed in a two-dimensional array structure based on the well logs acquired from the well at which lithofacies are to be estimated;

a model use step of outputting a probability of lithofacies at the target measured depth corresponding in kind to the lithofacies included in the label data of the train data sets for each kind of lithofacies as a result of inputting the unseen data to the lithofacies estimation model and deciding lithofacies having highest probability as an estimated lithofacies;

a transmission step of transmitting the estimated lithofacies to a user;

a determining step of determining, by the user based on the transmitted estimated lithofacies from the lithofacies estimation step, the existence of subsurface natural resources at the measured depth within the well; and a drilling step of drilling to the measured depth within the well, based on the existence of subsurface natural resources determined in the determining step.

In accordance with another aspect of the present invention, there is provided a method of estimating lithofacies by learning well logs, the method including:

a model formation step of forming lithofacies estimation model to output lithofacies corresponding to measured depth when the well logs are input based on train data sets including train data having values of multiple factors included in the well logs, the values being arranged corresponding to measured depth, and label data having lithofacies corresponding to measured depth as answers; and lithofacies estimation step of inputting unseen data having values of multiple factors included in well logs acquired from a well at which lithofacies are to be estimated, the values being arranged corresponding to measured depth, to the lithofacies estimation model to estimate lithofacies corresponding to measured depth, where the model formation step and the lithofacies estimation step are driven by a processor, where the model formation step includes:

a train data set generation step of generating train data sets including train data having values of the multiple factors included in the well logs, the values being arranged corresponding to measured depth, and label data having lithofacies corresponding to measured depth as answers, where a method of sampling data to be included in the train data sets is diversified such that at least some thereof generate another plurality of train data sets;

a model training step of training the lithofacies estimation model to output lithofacies corresponding to measured depth when the well logs are input, where lithofacies estimation models having various structures are trained using the plurality of train data sets, at least some of which are different from each other, in order to train a plurality of lithofacies estimation models different in at least one structure from the train data sets; and a model selection step of evaluating performance of the plurality of lithofacies estimation models different in at least one structure from the train data sets and selecting lithofacies estimation model having highest performance, where the train data set generation step comprises generating a plurality of train data sets including a plurality of well logs, at least some of which are different from each other, by performing at least one of:

optimal rate sampling for generating a plurality of train data sets at various rates in order to determine an optimal rate of data to be used as train data sets and data to be used as test data in the well logs;

uniform lithofacies sampling for selecting data such that lithofacies rates of well logs included in the train data sets are uniform;

random repetitive sampling for randomly extracting data from one or more well logs, where a determination is made as to whether each lithofacies included in finally extracted data exists at more than a predetermined rate and, in a case in which a specific lithofacies is included at less than the predetermined rate, extraction of data is repeated;

similar pattern sampling for extracting, in well units, well logs having a pattern similar to a pattern of a value of a specific factor of the well logs acquired from the well at which lithofacies are to be estimated in order to generate train data sets;

cluster sampling for selecting well logs acquired from a well belonging to a cluster predicted to have strata similar to strata of the well at which lithofacies are to be estimated in order to generate train data sets; or depth factor sampling for differently selecting a range of measured depths and a number and kind of factors included in train data sets configured to have a two-dimensional array structure;

a transmission step of transmitting the estimated lithofacies to a user;

a determining step of determining, by the user based on the transmitted estimated lithofacies from the lithofacies estimation step, the existence of subsurface natural resources at the measured depth within the well; and a drilling step of drilling to the measured depth within the well, based on the existence of subsurface natural resources determined in the determining step.

The lithofacies estimation model may have a CNN-ensemble structure including a plurality of unit models, each of which has a convolution neural network structure and at least some of which have been trained using another plurality of train data sets, and an ensemble process of synthesizing outputs of the plurality of unit models.

The method may further include an error correction step of, in a case in which lithofacies set as similar lithofacies exist in the estimated lithofacies output by the lithofacies estimation model, examining similarity of well logs at measured depths corresponding to the similar lithofacies and deciding that the estimated lithofacies is one of the similar lithofacies, where the error correction step compares well logs at a measured depth estimated as estimated lithofacies with well logs at a measured depth estimated as other estimated lithofacies and with well logs at a measured depth estimated as similar lithofacies, and selects lithofacies having short Euclidean distance, and where the error correction step is driven by a processor.

In accordance with another aspect of the present invention, there is provided an apparatus for estimating lithofacies by learning well logs, the apparatus including:

a well log database (DB) configured to store well logs, which are data acquired through measurement and analysis after drilling on strata, and lithofacies corresponding to measured depth;

a train data set generation unit configured to generate train data sets including train data having values of multiple factors included in the well logs, the values being arranged corresponding to measured depth using data stored in the well log DB, and label data having lithofacies corresponding to measured depth as answers;

a model training unit configured to train lithofacies estimation model to output lithofacies corresponding to measured depth when the well logs are input using the train data sets generated by the train data set generation unit; and lithofacies estimation unit configured to input unseen data having values of multiple factors included in well logs acquired from a well at which lithofacies are to be estimated, the values being arranged corresponding to measured depth, to the lithofacies estimation model trained by the model training unit in order to estimate lithofacies corresponding to measured depth, where the train data sets and the unseen data are measured values of the multiple factors included in the well logs corresponding to a target measured depth, a measured depth shallower than the target measured depth, and a measured depth deeper than the target measured depth, the measured values being disposed in a two-dimensional array structure based on the well logs acquired from the well at which lithofacies are to be estimated, and the lithofacies estimation model has a convolution neural network structure configured to output a probability of the lithofacies at the target measured depth corresponding in kind to the lithofacies included in the label data of the train data sets for each kind of lithofacies using the train data sets and to decide lithofacies having highest probability as an estimated lithofacies, where the two-dimensional array structure includes:

the measured depth located in a first column; and one or more factors located in subsequent columns, where the measured depth is arranged in odd-numbered rows with the target depth placed at the center, and the measured depth is arranged in order, where the lithofacies estimation model learns information about strata at the target measured depth and learns information about strata shallower than the target measured depth and strata deeper than the target measured depth, and where the train data set generation unit, the model training unit, and the lithofacies estimation unit are realized as program code and driven by a processor; and a display configured to transmit the estimated lithofacies to a user, where the user can determine, based on the transmitted estimated lithofacies from the lithofacies estimation unit, the existence of subsurface natural resources at the measured depth within the well, such that the user can drill to the measured depth within the well, based on the existence of subsurface natural resources determined in the determining step.

The apparatus may further include a well log database (DB) configured to store well logs, which are data acquired through measurement and analysis after drilling on strata, and lithofacies corresponding to measured depth;

a train data set generation unit configured to generate train data sets including train data having values of multiple factors included in the well logs, the values being arranged corresponding to measured depth using data stored in the well log DB, and label data having lithofacies corresponding to measured depth as answers;

a model training unit configured to train lithofacies estimation model to output lithofacies corresponding to measured depth when the well logs are input using the train data sets generated by the train data set generation unit; and lithofacies estimation unit configured to input unseen data having values of multiple factors included in well logs acquired from a well at which lithofacies are to be estimated, the values being arranged corresponding to measured depth, to the lithofacies estimation model trained by the model training unit in order to estimate lithofacies corresponding to measured depth, where the train data set generation unit generates train data sets including train data having values of the multiple factors included in the well logs, the values being arranged corresponding to measured depth, and label data having lithofacies corresponding to measured depth as answers, where a method of sampling data to be included in the train data sets is diversified such that at least some thereof generate another plurality of train data sets, the model training unit trains the lithofacies estimation model to output lithofacies corresponding to measured depth when the well logs are input, where lithofacies estimation models having various structures are trained using the plurality of train data sets, at least some of which are different from each other, in order to train a plurality of lithofacies estimation models different in at least one structure from the train data sets, and the apparatus further comprises a model selection unit configured to evaluate performance of the plurality of lithofacies estimation models different in at least one structure from the train data sets and to select lithofacies estimation model having highest performance, where the train data set generation unit, the model training unit, the lithofacies estimation unit, and the model selection unit are realized as program code and driven by a processor, where the train data set generation unit generates a plurality of train data sets including a plurality of well logs, at least some of which are different from each other, by performing at least one of:

optimal rate sampling for generating a plurality of train data sets at various rates in order to determine an optimal rate of data to be used as train data sets and data to be used as test data in the well logs;

uniform lithofacies sampling for selecting data such that lithofacies rates of well logs included in the train data sets are uniform;

random repetitive sampling for randomly extracting data from one or more well logs, where a determination is made as to whether each lithofacies included in finally extracted data exists at more than a predetermined rate and, in a case in which a specific lithofacies is included at less than the predetermined rate, extraction of data is repeated;

similar pattern sampling for extracting, in well units, well logs having a pattern similar to a pattern of a value of a specific factor of the well logs acquired from the well at which lithofacies are to be estimated in order to generate train data sets;

cluster sampling for selecting well logs acquired from a well belonging to a cluster predicted to have strata similar to strata of the well at which lithofacies are to be estimated in order to generate train data sets; or depth factor sampling for differently selecting a range of measured depths and a number and kind of factors included in train data sets configured to have a two-dimensional array structure; and the apparatus further includes a display configured to transmit the estimated lithofacies to a user, where the user can determine, based on the transmitted estimated lithofacies from the lithofacies estimation unit, the existence of subsurface natural resources at the measured depth within the well, such that the user can drill to the measured depth within the well, based on the existence of subsurface natural resources determined in the determining step.

The lithofacies estimation model may have a CNN-ensemble structure including a plurality of unit models, each of which has a convolution neural network structure and at least some of which have been trained using another plurality of train data sets, and an ensemble process of synthesizing outputs of the plurality of unit models.

The apparatus may further include an error correction unit configured, in a case in which lithofacies set as similar lithofacies exist in the estimated lithofacies output by the lithofacies estimation model, to examine similarity of well logs at measured depths corresponding to the similar lithofacies and to decide that the estimated lithofacies is one of the similar lithofacies, where the error correction unit compares well logs at a measured depth estimated as estimated lithofacies with well logs at a measured depth estimated as other estimated lithofacies and with well logs at a measured depth estimated as similar lithofacies, and selects lithofacies having short Euclidean distance, and where the error correction unit is realized as program code and driven by a processor.

The features and advantages of the present invention will be more clearly understood from the following detailed description taken in conjunction with the accompanying drawings.

It should be understood that the terms used in the specification and appended claims should not be construed as being limited to general and dictionary meanings, but should be construed based on meanings and concepts according to the spirit of the present invention on the basis of the principle that the inventor is permitted to define appropriate terms for the best explanation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
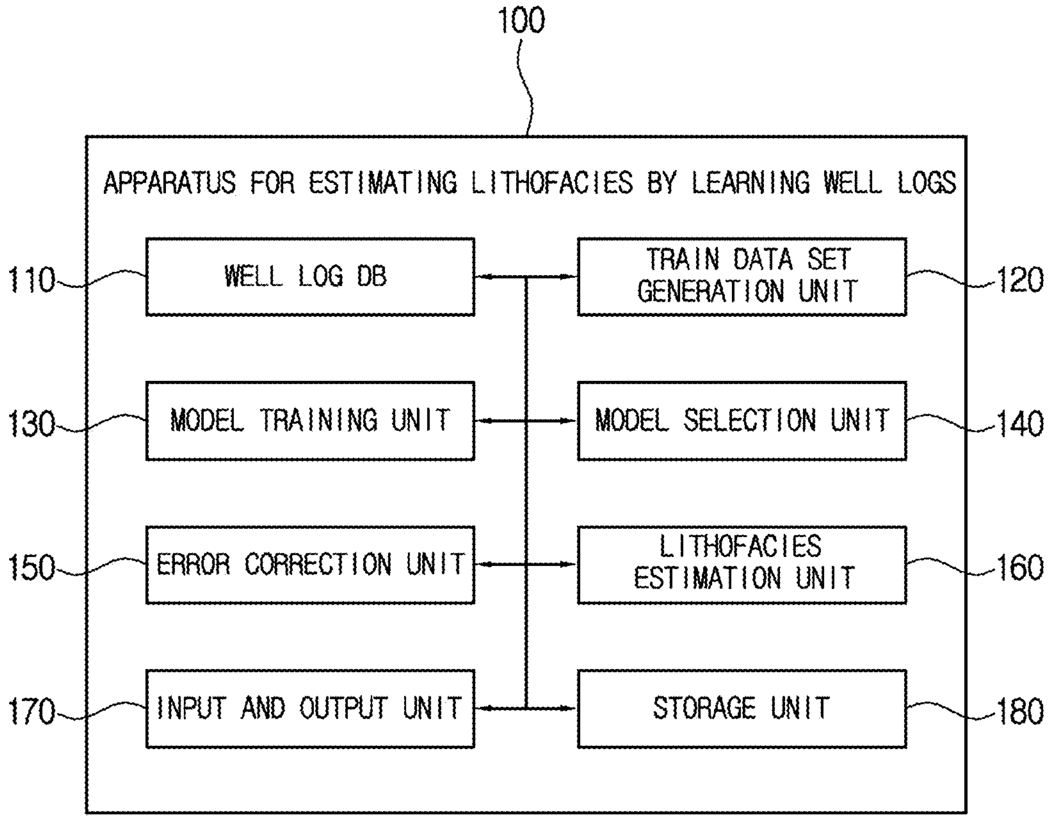
FIG. 1 is a block diagram showing an apparatus for estimating lithofacies by learning well logs according to an embodiment of the present invention.

Objects, advantages, and features of the present invention will be apparent from the following detailed description of embodiments with reference to the accompanying drawings. It should be noted that, when reference numerals are assigned to the elements of the drawings, the same reference numeral is assigned to the same elements even when they are illustrated in different drawings. In addition, the terms "first", "second", etc. are used to describe various elements irrespective of sequence and/or importance and to distinguish one element from another, and elements are not limited by the terms. When denoting elements with the terms "first", "second", etc. by reference numerals, "-1", "-2", etc. may be added to the reference numerals. In the following description of the embodiments of the present invention, a detailed description of known technology incorporated herein will be omitted when the same may obscure the subject matter of the embodiments of the present invention.

Hereinafter, the embodiments of the present invention will be described in detail with reference to the accompanying drawings.

FIG. 1 is a block diagram showing an apparatus 100 for estimating lithofacies by learning well logs according to an embodiment of the present invention.

Referring to FIG. 1, the apparatus 100 for estimating the lithofacies by learning the well logs according to the embodiment of the present invention may include a well log database (DB) 110, a train data set generation unit 120, a model training unit 130, a model selection unit 140, an error correction unit 150, lithofacies estimation unit 160, an input and output unit 170, and a storage unit 180.

Figures 2, 3:
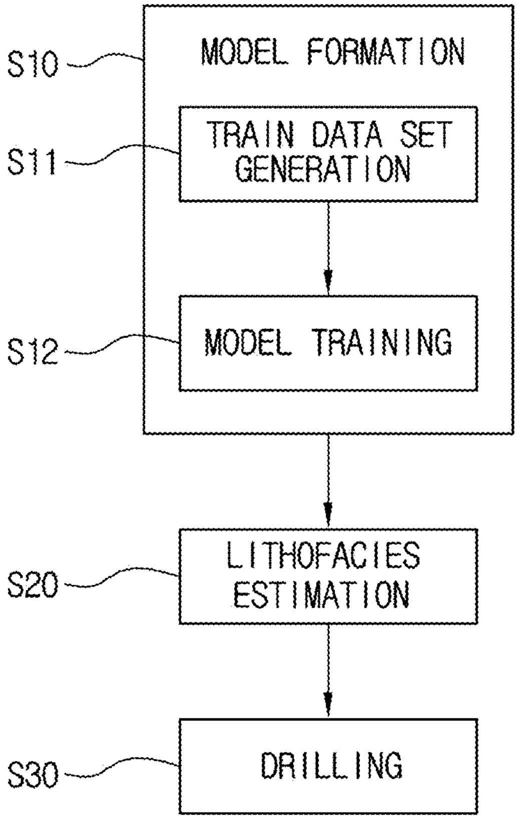
FIG. 2 is a view illustrating data stored in a well log DB according to an embodiment of the present invention.
FIG. 3 is a flowchart showing a method of estimating lithofacies by learning well logs according to an embodiment of the present invention.

FIG. 2 is a view illustrating data stored in a well log DB 110 according to an embodiment of the present invention.

Referring to FIG. 2, the well log DB 110 stores well logs, which are data acquired through measurement and analysis after drilling on strata, and lithofacies corresponding to measured depth. The well log DB 110 may store well logs including measured depths, types of factors, and values corresponding to the measured depth of the factors, lithofacies corresponding to measured depth, and information about wells together. Each well has its own log. The well logs may have various factors depending on drilling companies or drilling methods, and may be provided in various forms of data.

The factors of the well logs are data that can be acquired through direct measurement, or through calculation or analysis, while drilling on strata. The well logs include the measured values of the respective factors corresponding to measured depth.

The factors of the well logs may include measured depth, borehole diameter, Gamma ray, resistivity, bulk density, neutron porosity, photoelectric factor, compressional sonic, shear sonic, volume of clay, volume of calcite, volume of quartz, volume of tuff, effective porosity, water saturation, bulk modulus, P-wave velocity, and S-wave velocity.

The well log DB 110 stores lithofacies that were already analyzed and known in association with measured depths. The lithofacies indicate the type of rocks at respective measured depths.

The lithofacies may include shale, sandstone, coal, calcareous shale, and limestone.

The well logs may be stored together with information about a well from which the well log have been acquired. The information about the well may include information, such as serial number, name, and location of the well and drilling date. The location of the well may be indicated using latitude and longitude.

FIG. 1 is referred back to.

The train data set generation unit 120 may generate train data sets TS including train data TD having values of the multiple factors included in the well logs, the values being arranged corresponding to measured depth using data stored in the well log DB 110, and label data LD having lithofacies corresponding to measured depth as answers. The train data set generation unit 120 generates train data sets TS necessary to train lithofacies estimation model using the data stored in the well log DB 110. Specifically, the train data set generation unit 120 may sample data of well logs from which lithofacies corresponding to measured depth are known using various methods to generate train data sets TS including train data TD having values of the multiple factors included in the well logs, the values being arranged corresponding to measured depth, and label data LD having lithofacies corresponding to measured depth as answers. The train data set generation unit 120 may sample some of the data stored in the well log DB 110 and arrange the same in a structure set based on kind of the lithofacies estimation model to generate train data sets TS.

In the case in which the lithofacies estimation model has a convolution neural network structure that outputs a probability of lithofacies at a target measured depth corresponding in kind to the lithofacies included in label data LD of train data sets TS for each kind of lithofacies using the train data sets TS and decides lithofacies having the highest probability as an estimated lithofacies, train data sets TS and unseen data UD generated by the train data set generation unit 120 may be measured values of the multiple factors included in the well logs corresponding to a target measured depth, a measured depth shallower than the target measured depth, and a measured depth deeper than the target measured depth, the measured values being disposed in a two-dimensional matrix structure based on the well logs acquired from the well at which lithofacies are to be estimated.

The train data set generation unit 120 may generate test data sets TS including train data TD having values of the multiple factors included in the well logs, the values being arranged corresponding to measured depth, and label data LD having lithofacies corresponding to measured depth as answers. A method of sampling data to be included in the train data sets TS may be diversified such that at least some thereof generate another plurality of train data sets TS. The train data set generation unit 120 sampling data of the well logs to generate the train data sets TS will be described in detail below.

The train data set generation unit 120 may generate test data necessary to evaluate performance of the lithofacies estimation model. The train data set generation unit 120 may generate test data using well logs that are not included in the train data sets TS. The test data includes train data and label data, in the same manner as the train data sets, and is not used to train the lithofacies estimation model but is used in a process of evaluating performance of the lithofacies estimation model. The train data set generation unit 120 may arrange the test data in a structure set based on kind of the lithofacies estimation model.

The train data set generation unit 120 may generate unseen data UD having values of the multiple factors included in the well logs acquired from the well at which lithofacies are to be estimated, the values being arranged corresponding to measured depth. The unseen data UD may be generated in the same structure as the train data TD of the train data sets TS used to train the selected lithofacies estimation model.

The model training unit 130 trains the lithofacies estimation model using the train data sets TS. The model training unit 130 trains the lithofacies estimation model to output lithofacies corresponding to measured depth when the well logs are input using the train data sets TS generated by the train data set generation unit 120. The model training unit 130 may input the label data LD of the train data sets TS and compare predicted label PL output from the lithofacies estimation model with the label data LD of the train data sets TS to repeatedly train the lithofacies estimation model.

The model training unit 130 may train the lithofacies estimation model to output lithofacies corresponding to measured depth when the well logs are input. The model training unit 130 may train lithofacies estimation models having various structures using a plurality of train data sets TS, at least some of which are different from each other, in order to train a plurality of lithofacies estimation models different in at least one structure from the train data sets TS. The lithofacies estimation model may include a support vector machine, a random forest, a convolution neural network structure, an ensemble structure using the convolution neural network, and other artificial intelligence models. The model training unit 130 may train lithofacies estimation model for each of the train data sets TS generated by the train data set generation unit 120 in order to train a plurality of different lithofacies estimation models.

The model selection unit 140 evaluates performance of the lithofacies estimation models trained by the model training unit 130, and selects a model having the highest performance. The model selection unit 140 may evaluate performance of a plurality of lithofacies estimation models different in at least one structure from the train data sets, and may select lithofacies estimation model having the highest performance. The model selection unit 140 may evaluate performance of the lithofacies estimation model using an evaluation method, such as accuracy, precision, recall, or weighted F1 score. The model selection unit 140 may support evaluation in performance of the model by visualizing performance of the lithofacies estimation model through a confusion matrix such that estimated lithofacies and actual lithofacies are compared with each other in order to determine whether the lithofacies coincide with each other.

In the case in which lithofacies set as similar lithofacies exist in the estimated lithofacies output by the lithofacies estimation model, the error correction unit 150 examines similarity of well logs at measured depths corresponding to the similar lithofacies and decides that an estimated lithofacies is one of the similar lithofacies. The error correction unit 150 may correct an error in that the lithofacies estimation model falsely estimates the similar lithofacies. An error due to the similar lithofacies may be generated in the case in which lithofacies have similar properties although the lithofacies are different from each other. The similar lithofacies may be set in advance. For example, shale and tight sand having low porosity may be set as similar lithofacies, and tight sand having low porosity and oil tight sand containing oil and having low porosity may be set as similar lithofacies. In the case in which the lithofacies estimation model estimates that lithofacies set as similar lithofacies exist, the error correction unit 150 may perform an error correction step. An error due to the similar lithofacies may be corrected by determining which of the similar lithofacies corresponds to strata at a target measured depth based on similarity of well logs.

The lithofacies estimation unit 160 inputs the unseen data UD having values of the multiple factors included in the well logs acquired from the well at which lithofacies are to be estimated, the values being arranged corresponding to measured depth, to the trained lithofacies estimation model to estimate lithofacies corresponding to measured depth. The lithofacies estimation unit 160 may generate the results of estimation of lithofacies corresponding to measured depth as a visual chart and output the same. For example, the lithofacies estimation unit 160 may generate a visual chart showing lithofacies estimated corresponding to measured depth by sorting a plurality of lithofacies using different colors or patterns, and may output the same.

The input and output unit 170 may allow the well logs to be input from the outside or may output an estimation result or a learning result to the outside. The input and output unit 170 may include a display capable of visually displaying data, such that a user can drill to a measured depth within a well, based on the existence of determined subsurface natural resources. The input and output unit 170 may further include a communication module for transmission and reception of data, a port for transmission and reception of data, a touch panel configured to receive user input, and an input and output device, such as a keyboard or a mouse.

The storage unit 180 may store program code necessary to perform a method of learning well logs according to an embodiment of the present invention to estimate lithofacies, the structure of lithofacies estimation model, a trained lithofacies estimation model, an error correction algorithm, an error correction result, a visual chart, and other information.

The train data set generation unit 120, the model training unit 130, the model selection unit 140, the error correction unit 150, and the lithofacies estimation unit 160 according to the embodiment of the present invention may be realized as program code so as to be driven by an information processing device, such as a processor, a central processing unit (CPU), a graphics processing unit (GPU), or a neuromorphic chip.

FIG. 3 is a flowchart showing a method of estimating lithofacies by learning well logs according to an embodiment of the present invention.

Referring to FIG. 3, the method of estimating the lithofacies by learning the well logs according to the embodiment of the present invention may include:

a model formation step (S10) of forming lithofacies estimation model to output lithofacies corresponding to measured depth when the well logs are input based on train data sets TS including train data TD having values of multiple factors included in the well logs, the values being arranged corresponding to measured depth, and label data LD having lithofacies corresponding to measured depth as answers; and lithofacies estimation step (S20) of inputting unseen data UD having values of multiple factors included in well logs acquired from a well at which lithofacies are to be estimated, the values being arranged corresponding to measured depth, to the lithofacies estimation model to estimate lithofacies corresponding to measured depth.

The model formation step (S10) may include:

a train data set generation step (S11) of generating train data sets TS by generating train data TD having measured values of the multiple factors included in the well logs corresponding to a target measured depth, a measured depth shallower than the target measured depth, and a measured depth deeper than the target measured depth, the measured values being disposed in a two-dimensional matrix structure, and generating label data LD having lithofacies at the target measured depth as answers; and a model training step (S12) of training lithofacies estimation model having a convolution neural network structure that outputs a probability of the lithofacies at the target measured depth corresponding in kind to the lithofacies included in the label data LD of the train data sets TS for each kind of lithofacies using the train data sets TS and decides lithofacies having the highest probability as an estimated lithofacies. The estimated lithofacies are the final lithofacies that the lithofacies estimation model estimates as the strata at the target measured depth.

The train data set generation unit 120 may perform the train data set generation step (S11). In the train data set generation step (S11), the train data set generation unit 120 forms train data sets using a portion of the well logs and the lithofacies stored in the well log DB 110. In the train data set generation step (S11), the structure of the train data sets TS may be changed depending on the structure of lithofacies estimation model to be trained.

As shown in FIG. 3, the method of estimating the lithofacies by learning the well logs according to the embodiment of the present invention may further include:

a drilling step (S30) of drilling to the measured depth within the well, based on the existence of subsurface natural resources determined in the lithofacies estimation step (S20). Estimated lithofacies and fluid type based on wells can be used to determine new well location such as exploration or appraisal well in 3-Dimensional lithofacies volume by integration with 3D seismic data. Lithofacies along new well's trajectory (or well path) from 3-Dimensional lithofacies data can be used for pore pressure prediction which is critical component for drilling preparation and safe drilling operations.

Figure 4:
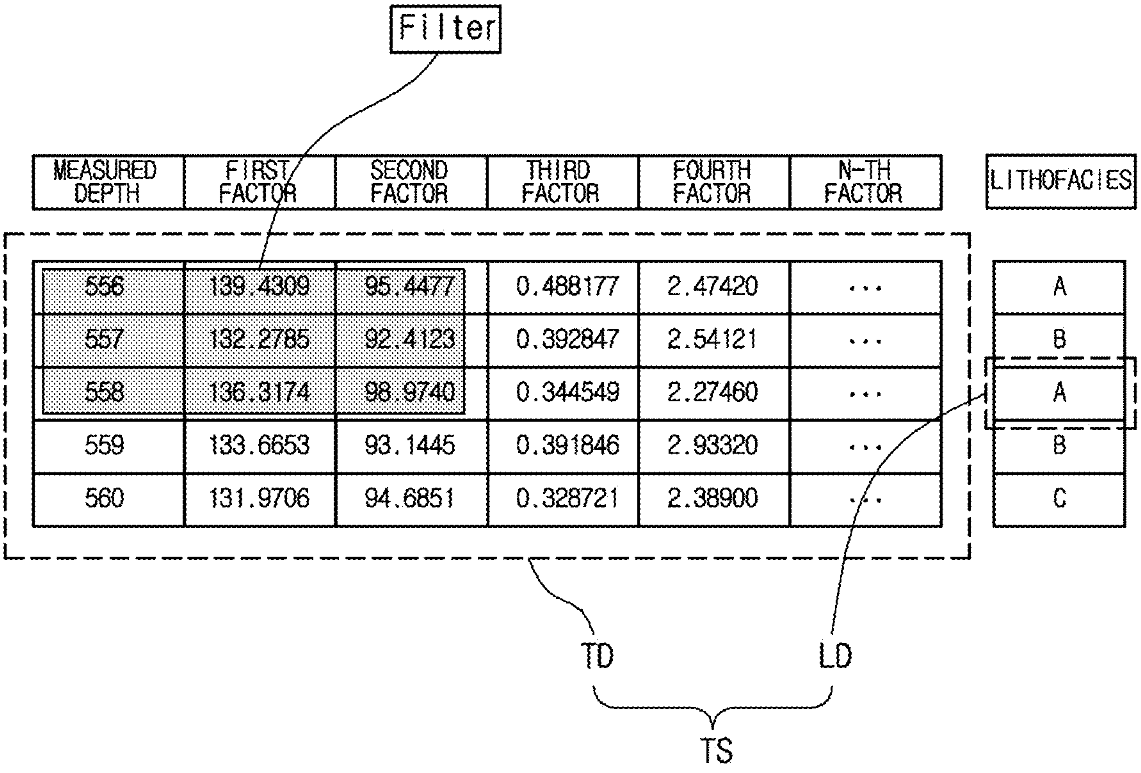
FIG. 4 is a view exemplarily showing train data sets according to an embodiment of the present invention.

FIG. 4 is a view exemplarily showing train data sets TS according to an embodiment of the present invention. The train data sets TS structure of FIG. 4 is a structure used in lithofacies estimation model having a convolution neural network structure.

Referring to FIG. 4, train data sets TS may include input ID having a portion of the well logs arranged in a two-dimensional matrix form and label data LD having lithofacies corresponding to a target measured depth. For example, the train data TD may have a matrix structure in which rows (or columns) including a target measured depth, a measured depth shallower than the target measured depth, and a measured depth deeper than the target measured depth are provided, a measured depth is located in a first column, and first to fifth factors are located in second to sixth columns, whereby the well logs has a number of rows (or columns) corresponding to the number of factors included in the train data sets TS. The rows and the columns may be exchanged with each other, and the positions of the factors may be changed. Preferably, the measured depths are arranged in order. FIG. 4 exemplarily shows that the train data TD has a 5×6 matrix structure, the values of the factors based on depth are arbitrarily stated.

The measured depth included in the train data TD may include a target measured depth, a measured depth shallower than the target measured depth, and a measured depth deeper than the target measured depth. Three measured depths (a target measured depth, a shallow measured depth, and a deep measured depth), five measured depths (a target measured depth, two shallow measured depths, and two deep measured depths), or seven measured depths (a target measured depth, three shallow measured depths, and three deep measured depths) may be selected. For example, in the case in which the target measured depth is 558 m, the number of measured depths included in the train data TD may be five, such as 558 m, which is the target measured depth, 556 m and 557 m, which are measured depths shallower than the target measured depth, and 559 m and 560 m, which are measured depths deeper than the target measured depth.

The factors included in the train data TD may include a measured depth and other factors. In the case in which the measured depth and the first to fifth factors are selected, six factors are provided, and values of the first to fifth factors corresponding to measured depth are included in the train data TD.

Figure 5:
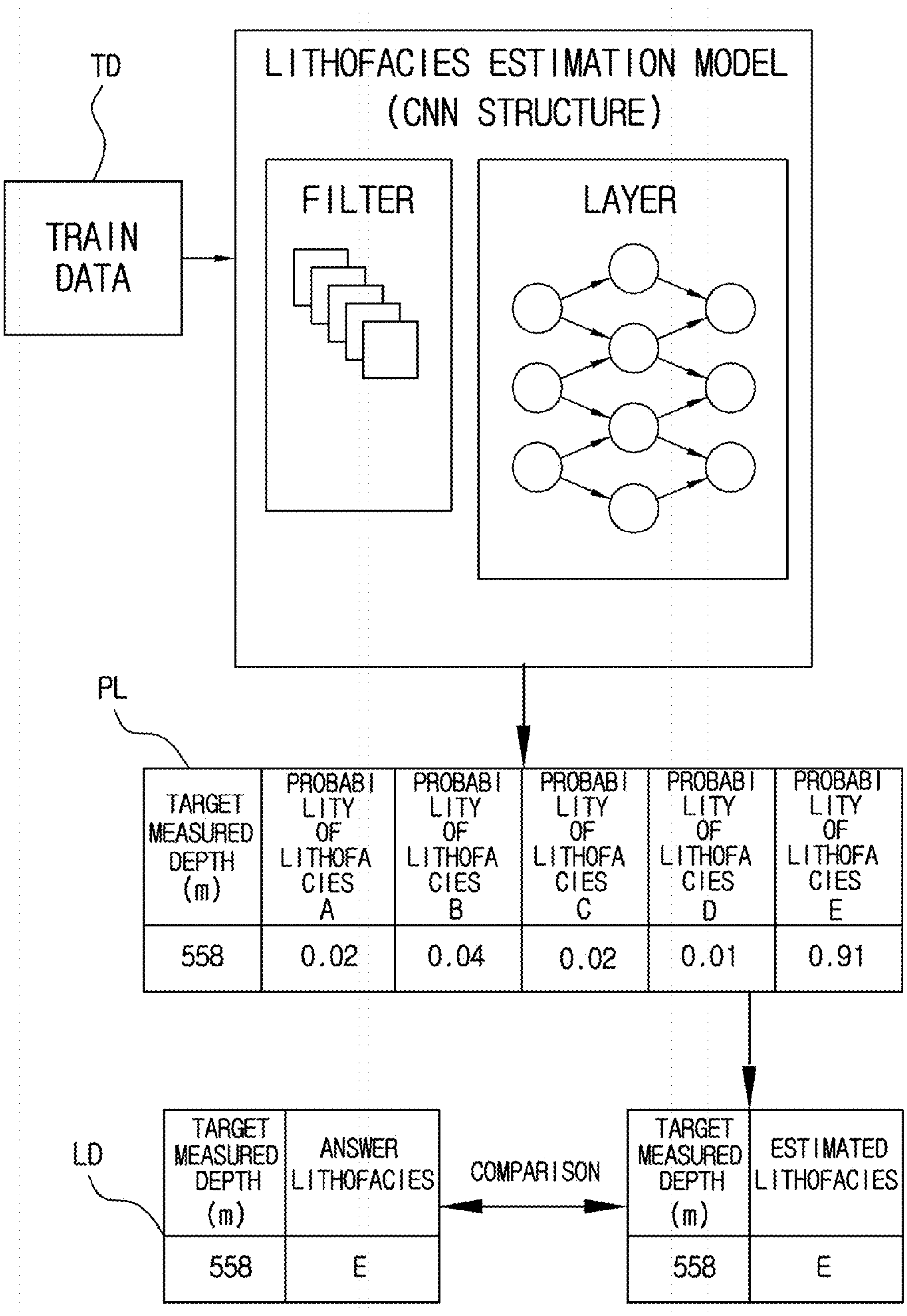
FIG. 5 is a view illustrating lithofacies estimation model having a convolution neural network structure according to an embodiment of the present invention.

FIG. 5 is a view illustrating lithofacies estimation model having a convolution neural network structure according to an embodiment of the present invention. In this specification and the accompanying drawings, the "convolution neural network" may be simply referred to as a "CNN."

As shown in FIG. 5, the lithofacies estimation model according to the embodiment of the present invention may have a convolution neural network structure. In the CNN structure, a filter may be a 2-D filter having a size of 3×3, and three hidden layers may be provided.

The lithofacies estimation model having the CNN structure may output a probability of lithofacies at a target measured depth corresponding in kind to the lithofacies included in the label data LD of the train data sets TS for each kind of lithofacies. For example, in the case in which lithofacies A to E exist in the label data LD of the train data sets TS and the target measured depth is 558 m, a probability of lithofacies A, a probability of lithofacies B, a probability of lithofacies C, a probability of lithofacies D, and a probability of lithofacies E at the target measured depth are all output. The sum of the probabilities of all kinds of lithofacies output at the target measured depth is 1.

The lithofacies estimation model having the CNN structure may decide lithofacies having the highest probability, among the lithofacies output for each kind of lithofacies, as an estimated lithofacies. As shown in FIG. 5, a probability of lithofacies E is 0.91, which is the highest, among the predicted label PL of the lithofacies estimation model, and therefore the lithofacies estimation model having the CNN structure may decide the estimated lithofacies at 558 m as lithofacies E.

When the estimated lithofacies is decided, the model training unit 130 compares the same with an answer lithofacies of the label data LD. In the case in which the estimated lithofacies is different from the lithofacies of the label data LD, the model training unit 130 may repeatedly train the lithofacies estimation model. In the case in which the estimated lithofacies and the answer lithofacies coincide with each other at a predetermined rate or more, the model training unit 130 may determine that training has been completed and may stop training.

Figure 6:
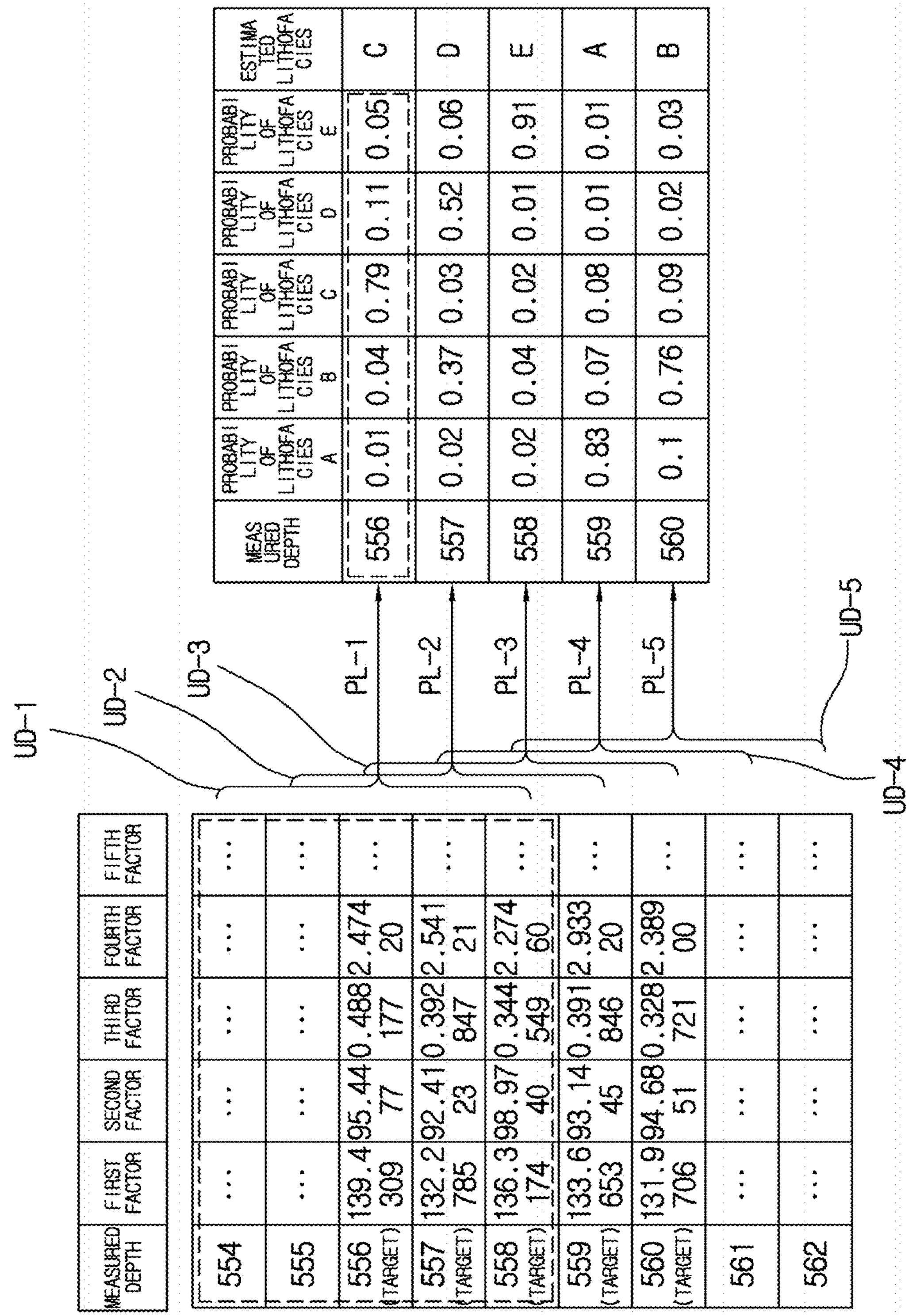
FIG. 6 is a view exemplarily showing unseen data and predicted label based on the lithofacies estimation model having the convolution neural network structure according to the embodiment of the present invention.

FIG. 6 is a view exemplarily showing unseen data UD and predicted label PL based on the lithofacies estimation model having the convolution neural network structure according to the embodiment of the present invention.

The lithofacies estimation step (S20) may be performed by the lithofacies estimation unit. The lithofacies estimation step (S20) may be performed using the lithofacies estimation model trained by the model training unit 130 using the train data sets TS generated by the train data set generation unit 120.

The lithofacies estimation step (S20) may include:

an unseen data UD generation step of generating unseen data UD having measured values of the multiple factors included in the well logs corresponding to a target measured depth, a measured depth shallower than the target measured depth, and a measured depth deeper than the target measured depth, the measured values being disposed in a two-dimensional matrix structure based on the well logs acquired from the well at which lithofacies are to be estimated; and a model use step of outputting a probability of lithofacies at the target measured depth corresponding in kind to the lithofacies included in the label data LD of the train data sets TS for each kind of lithofacies as the result of inputting the unseen data UD to the lithofacies estimation model and deciding lithofacies having the highest probability as an estimated lithofacies.

In the lithofacies estimation step (S20), lithofacies may be estimated for each of the measured depths included in the well logs obtained from the well at which estimation of the lithofacies is necessary in order to estimate lithofacies at some or all of the entire depths of the well. In the lithofacies estimation step (S20), the unseen data UD generation step and the model use step may be repeatedly performed for each target measured depth in order to estimate lithofacies at some or all of the measured depths of the well at which estimation of the lithofacies is necessary.

For example, as shown in FIG. 6, in the case in which first to fifth unseen data UD are input to the lithofacies estimation model, first to fifth predicted label PL may be output, whereby an estimated lithofacies at the target measured depth may be decided. Specifically, in the case in which the target measured depth at which lithofacies are to be estimated is a range of 556 m to 560 m, the first unseen data UD may include a target measured depth of 556 m, measured depths shallower than the target measured depth of 554 m and 555 m, measured depths deeper than the target measured depth of 557 m and 558 m, and values of first to fifth factors corresponding to the depths. In the case in which the first unseen data UD are input to the lithofacies estimation model having the CNN structure, probabilities of strata at the target measured depth corresponding to lithofacies A to E may be output, and lithofacies C, which has the highest probability, may be decided as an estimated lithofacies. In the same manner, the second unseen data UD having a target measured depth of 557 m may include measured depths having a range of 555 m to 559 m and values of first to fifth factors, which may be arranged in a two-dimensional matrix structure corresponding to the measured depth.

In an embodiment of the present invention, the train data TD of the train data sets TS and the unseen data UD are generated in a two-dimensional matrix structure and are input to the lithofacies estimation model having the CNN structure, whereby the lithofacies estimation model may learn information about strata at a target measured depth and may also learn information about strata shallower than the target measured depth and strata deeper than the target measured depth. Consequently, it is possible for the lithofacies estimation model to more accurately estimate the lithofacies at the strata corresponding to the target measured depth.

Figure 7:
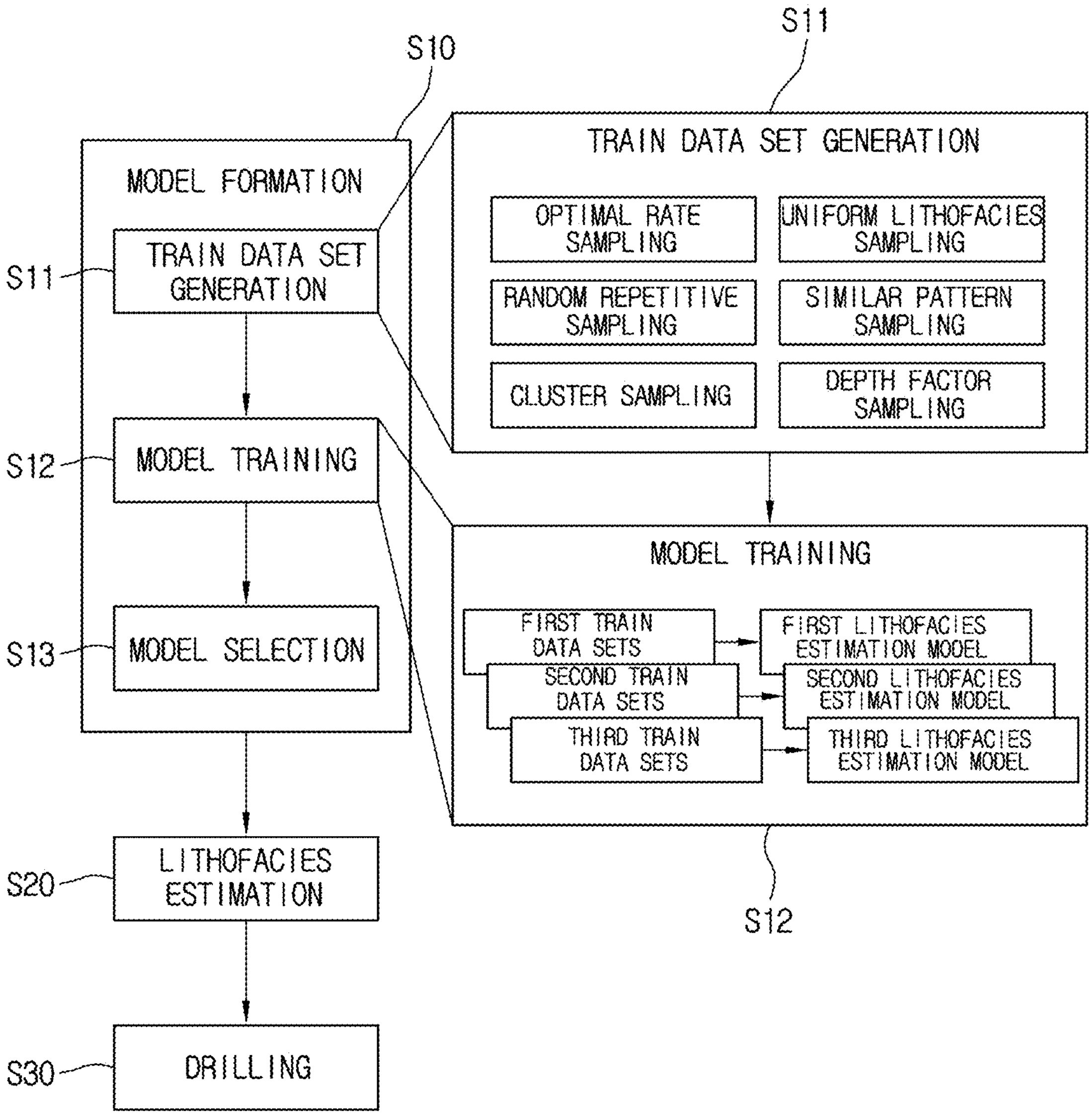
FIG. 7 is a flowchart showing a model formation step further including a model selection step according to an embodiment of the present invention.

FIG. 7 is a flowchart showing a model formation step (S10) further including a model selection step (S13) according to an embodiment of the present invention.

The model formation step (S10) may include:

a train data set generation step (S11) of generating train data sets TS including train data TD having values of the multiple factors included in the well logs, the values being arranged corresponding to measured depth, and label data LD having lithofacies corresponding to measured depth as answers, wherein a method of sampling data to be included in the train data sets TS may be diversified such that at least some thereof generate another plurality of train data sets TS;

a model training step (S12) of training the lithofacies estimation model to output lithofacies corresponding to measured depth when the well logs is input, wherein lithofacies estimation models having various structures are trained using the plurality of train data sets TS, at least some of which are different from each other, in order to train a plurality of lithofacies estimation models different in at least one structure from the train data sets TS; and a model selection step (S13) of evaluating performance of the plurality of lithofacies estimation models different in at least one structure from the train data sets TS and selecting lithofacies estimation model having the highest performance.

The well logs stored in the well log DB 110 are acquired from wells formed in various strata. The wells are different from each other in terms of various items, such as the kind of lithofacies, the rate and depth of lithofacies, the kind of measured factors, the pattern of factor values, and the location of the wells. In order to accurately estimate lithofacies at an arbitrary well using well logs acquired from a plurality of wells having different properties, it is important to select data of the well logs to be included in the train data sets TS.

In the train data set generation step (S11), at least one of optimal rate sampling, uniform lithofacies sampling, random repetitive sampling, similar pattern sampling, cluster sampling, or depth factor sampling may be performed to generate train data sets TS, and two or more kinds of sampling may be simultaneously performed to generate train data sets TS.

Optimal rate sampling entails generating a plurality of train data sets TS at various rates in order to determine an optimal rate of data to be used as train data sets TS and data to be used as test data in the well logs. For example, in the case in which train data sets TS are generated using well logs of first to fourth wells, 80% of data in the well logs of the first to fourth wells may be generated as train data sets TS, and 20% of the data may be generated as test data. When the train data sets TS are sampled at rates of 80%, 70%, and 60%, three train data sets TS are generated, respectively. Three lithofacies estimation models may be trained using the three train data sets TS, and performance of the three lithofacies estimation models may be evaluated in order to determine a rate of train data sets TS which results in the highest performance.

Uniform lithofacies sampling entails selecting data such that the lithofacies rates of well logs included in the train data sets TS are uniform. In the case in which lithofacies to be determined are five in kind, e.g. A to E, data in the well logs may be selected through uniform lithofacies sampling such that a rate of lithofacies A is 20%, a rate of lithofacies B is 20%, a rate of lithofacies C is 20%, a rate of lithofacies D is 20%, and a rate of lithofacies E is 20%. Since a specific lithofacies may be distributed in large quantities and other lithofacies may hardly exist depending on the strata in which the well is formed and the location of the well, the distribution of lithofacies in well logs acquired from a single well may be nonuniform. In the case in which train data sets TS are generated using the well logs having nonuniform distribution of lithofacies without any change, accuracy in estimation of lithofacies having a high distribution rate may be high, but accuracy in estimation of lithofacies having a low distribution rate may be low. In the case in which the lithofacies estimation model is trained using the train data sets TS generated by performing uniform lithofacies sampling, it is possible for the lithofacies estimation model to learn uniform information about each lithofacies.

Random repetitive sampling entails randomly extracting data from one or more well logs. A determination is made as to whether each lithofacies included in the finally extracted data exists at more than a predetermined rate. In the case in which a specific lithofacies is included at less than the predetermined rate, extraction of data is repeated. In random repetitive sampling, a rate of each lithofacies is a value that can be set. In the case in which there exist lithofacies that are difficult to distinguish from each other, a rate of lithofacies may be adjusted so as to be high such that a large amount of well log data related to the specific lithofacies are included in the train data sets TS and the lithofacies estimation model can learn a larger amount of data related to lithofacies that are difficult to distinguish from each other.

Similar pattern sampling entails extracting, in well units, well logs having a pattern similar to the pattern of the value of a specific factor of the well logs acquired from the well at which lithofacies are to be estimated in order to generate train data sets TS. For example, when the value of a specific factor of well logs acquired from a well at which lithofacies are to be estimated is within a range of 130 to 140, well log data having similar patterns in the state in which the value of the specific factor is within a range of 130 to 140 or a range adjacent thereto, among well logs acquired from various wells stored in the well log DB 110, may be selected in well units or only data having similar patterns are selected so as to be included in the train data sets TS, and the well logs in which the value of the specific factor is within a range of 50 to 60 may be excluded so as not to be included in the train data sets TS. In the similar pattern sampling, it is possible to train the lithofacies estimation model using well logs having a range of values similar to that of the well logs acquired from the well at which the lithofacies is to be estimated, whereby it is possible to improve accuracy in estimation of the lithofacies.

Cluster sampling entails selecting well logs acquired from a well belonging to a cluster predicted to have strata similar to that of the well at which lithofacies are to be estimated in order to generate train data sets TS. In the cluster sampling, well logs acquired from a predetermined number of wells in the order close to a well at which lithofacies are to be estimated may be selected to generate train data sets TS. Alternatively, in cluster sampling, the values of factors of well logs acquired from a well at which lithofacies are to be estimated and well logs stored in the well log DB 110 may be classified in well units using a cluster algorithm, and well logs acquired from wells classified as the same cluster may be selected to generate train data sets TS. A well-known algorithm, such as a k-means algorithm, may be used as the cluster algorithm. In general, wells close in distance to each other are expected to have similar stratigraphic properties. In the case in which cluster sampling is performed based on a short distance, therefore, it is possible to improve accuracy in estimation of the lithofacies. Meanwhile, even nearby wells may have non-similar stratigraphic properties for reasons, such as existence of a dislocation between wells.

Consequently, in the cluster sampling, in which a well generally having similar values of factors is selected using the cluster algorithm, it is possible to improve accuracy in estimation of the lithofacies.

Depth factor sampling entails differently selecting the range of measured depths and the number and kind of factors included in train data sets TS configured to have a two-dimensional matrix structure. Referring to FIG. 4, five measured depths may be included in the train data sets TS, and a total of six factors, including a measured depth and first to fifth factors, may be included in the train data sets TS. In the case in which depth factor sampling is performed, a plurality of train data sets TS having various combinations, such as the case in which the number of measured depths is 3, 5, 7, 9, or more and the case in which the number of factors is 3, 4, 5, 6, 7, 9, or more, may be generated. In addition, a plurality of train data sets TS having the same number of factors but different kinds of factors may be generated. In addition, a plurality of train data sets TS having the same number and kind of factors but different sequences of factors may be generated. The lithofacies estimation model may be trained using each of the plurality of train data sets TS and then performance of the lithofacies estimation model may be evaluated, whereby it is possible to know the number of measured depths having the highest performance, the number of factors, the kind of factors, and the sequence of factors.

In the train data set generation step (S11), at least one of optimal rate sampling, uniform lithofacies sampling, random repetitive sampling, similar pattern sampling, cluster sampling, or depth factor sampling described above may be performed to generate a plurality of train data sets TS, at least some of which includes another plurality of well logs. In the train data set generation step (S11), when a piece of train data sets TS is generated, one or more kinds of sampling may be performed together.

In the model training step (S12), lithofacies estimation models having various structures may be trained using various train data sets TS generated in the train data set generation step (S11). The lithofacies estimation model that the model training unit 130 may use in the model training step (S12) may include a support vector machine, a random forest, a convolution neural network structure, an ensemble structure using the convolution neural network, and other artificial intelligence models. A plurality of train data sets TS generated through sampling in the train data set generation step (S11) is generated such that at least some thereof are different from each other. Even in the case in which the same lithofacies estimation model is used, therefore, performance may be changed due to a difference in train data sets TS. In addition, even in the case in which the same train data sets TS are used, performance may be changed depending on the structure of the lithofacies estimation model. In the model training step (S12), the model training unit 130 may train lithofacies estimation models having various structures using various train data sets TS to generate a plurality of trained lithofacies estimation models.

The model selection step (S13) may be performed by the model selection unit 140. The model selection unit 140 may input test data to a plurality of lithofacies estimation models in order to evaluate performance of the lithofacies estimation models. A well-known evaluation method, such as accuracy, precision, recall, or weighted F1 score, may be used as a metric evaluating the performance in the model selection step (S13). In the model selection step (S13), performance of a plurality of lithofacies estimation models trained using the train data sets TS generated through sampling is evaluated, and lithofacies estimation model having the highest performance is selected. The selected lithofacies estimation model may be used in the lithofacies estimation step (S20).

Table 1 below shows the results of evaluation of accuracy of lithofacies estimation models having a support vector machine, a random forest, and a CNN structure trained using a plurality of train data sets TS generated by performing optimal rate sampling in the train data set generation step (S11).

TABLE 1

| Rate of train data sets (TS) | Lithofacies estimation model | Accuracy | F1 score | Precision | Recall |
|---|---|---|---|---|---|
| 80% | Support vector machine | 97.1 | 97.1 | 97.2 | 97.1 |
| 80% | Random forest | 95.5 | 95.5 | 95.6 | 95.5 |
| 80% | CNN structure | 97.5 | 97.6 | 97.7 | 97.6 |
| 60% | Support vector machine | 96.2 | 96.2 | 96.2 | 96.2 |
| 60% | Random forest | 95.0 | 95.0 | 95.0 | 95.0 |
| 60% | CNN structure | 97.6 | 97.6 | 97.7 | 97.6 |
| 50% | Support vector machine | 97.2 | 97.2 | 97.2 | 97.2 |
| 50% | Random forest | 95.8 | 95.8 | 95.8 | 95.8 |
| 50% | CNN structure | 97.3 | 97.3 | 97.3 | 97.3 |

As shown in Table 1, it can be seen that, in the case in which the lithofacies estimation model has a CNN structure, accuracy is 97.5 when the rate of train data sets TS is 80%, accuracy is 97.6 when the rate of train data sets TS is 60%, and accuracy is 97.3 when the rate of train data sets TS is 50%. That is, accuracy is higher when the rate of train data sets TS is 60% than when the rate of train data sets TS is 80%. In the case in which lithofacies estimation model having a CNN structure is used, therefore, accuracy is high when train data sets TS having a rate of train data sets TS of 60% is selected. When comparing lithofacies estimation models with each other, it can be seen that the CNN structure has the highest accuracy at all rates of train data sets TS. In the model selection step (S13), therefore, lithofacies estimation model having a CNN structure trained using train data sets TS having a rate of train data sets TS of 60% may be finally selected. Table 2 below shows the results of evaluation of accuracy of lithofacies estimation model trained using a plurality of train data sets TS generated by performing depth factor sampling in the train data set generation step (S11).

TABLE 2

| Number (kind) of factors of train data (TD) | Accuracy | F1 score | Precision | Recall |
|---|---|---|---|---|
| 7 | 89.7 | 89.7 | 89.7 | 89.7 |
| 6 | 74.3 | 72.8 | 71.6 | 74.3 |
| 4 | 65.6 | 64.4 | 64.0 | 65.6 |
| 5 (Factors: ABCDE) | 87.9 | 87.9 | 87.9 | 87.9 |
| 5 (Factors: CDEFG) | 90.9 | 90.9 | 91.0 | 90.9 |

As shown in Table 2, it is possible to confirm accuracy in the case in which the number of factors included in the train data TD of the train data sets TS is 7, 6, and 5, in the case in which the number of factors is 5 and the kinds of factors are A, B, C, D, and E, and in the case in which the number of factors is 5 and the kinds of factors are C, D, E, F, and G, i.e. five kinds. It can be confirmed that accuracy generally increases as the number of factors of the train data TD is increased. In the case in which the number of factors is 5 and the kinds of factors are C, D, E, F, and G, however, accuracy is 90.0, which is the highest. In the model selection step (S13), therefore, lithofacies estimation model trained using train data sets TS in which the number of factors is 5 and the kinds of factors are C, D, E, F, and G may be finally selected. As described with reference to Tables 1 and 2, a plurality of train data sets TS, at least some of which are different from each other, may be generated in the train data set generation step (S11), lithofacies estimation models having various structures trained using the plurality of train data sets TS may be generated in the model training step (S12), and test data may be input to the various lithofacies estimation models to evaluate performance of the lithofacies estimation models and lithofacies estimation model having the highest performance may be selected in the model selection step (S13).

Hereinafter, lithofacies estimation model having a CNN-ensemble structure having the highest performance as the result of evaluation of performance of the lithofacies estimation models according to an embodiment of the present invention will be described.

Figure 8:
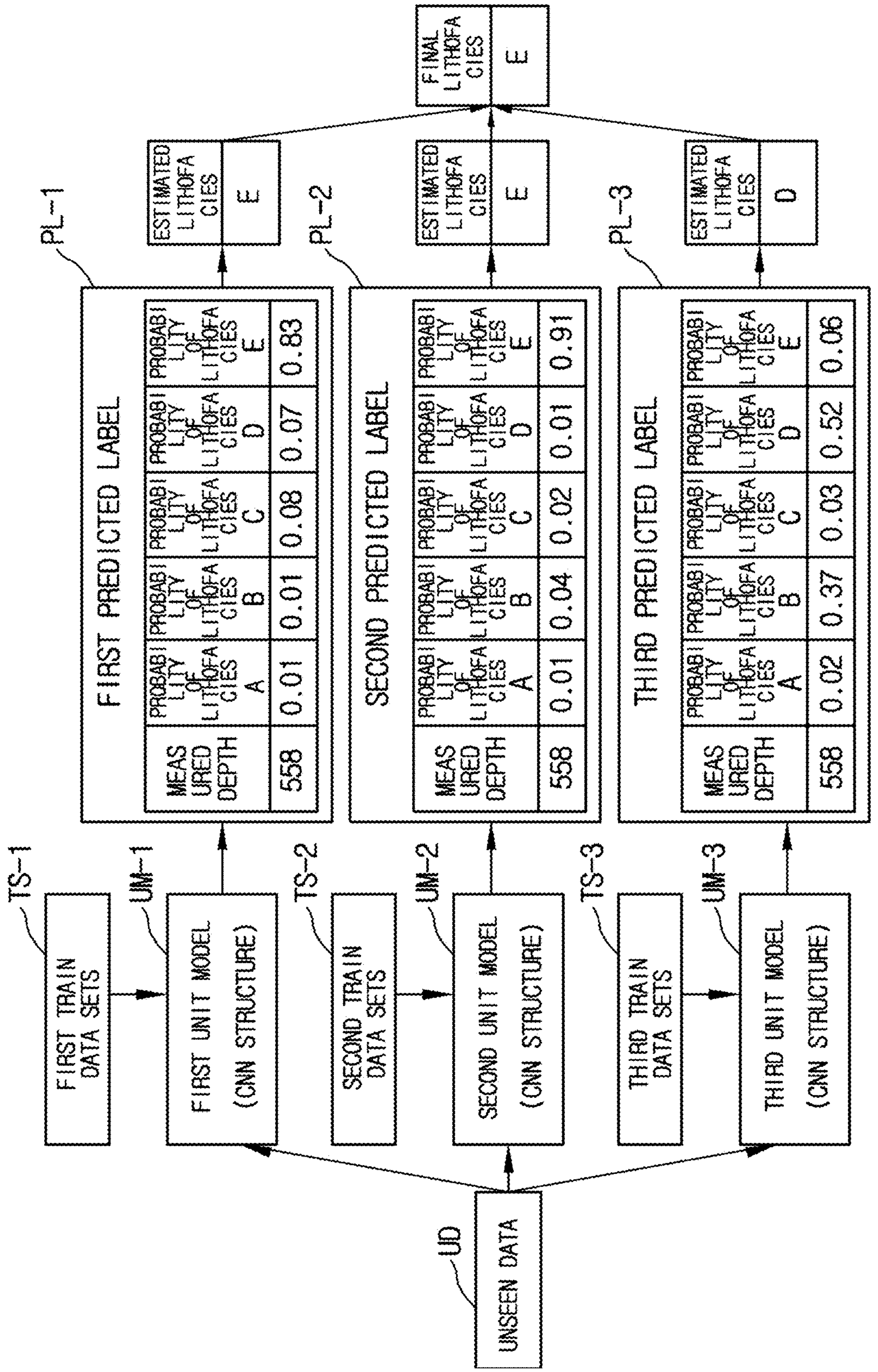
FIG. 8 is a view showing lithofacies estimation model having a CNN-ensemble structure according to an embodiment of the present invention.

FIG. 8 is a view showing lithofacies estimation model having a CNN-ensemble structure according to an embodiment of the present invention.

The lithofacies estimation model according to the embodiment of the present invention may have a CNN-ensemble structure including a plurality of unit models UM, each of which has a convolution neural network structure and at least some of which have been trained using another plurality of train data sets TS, and an ensemble process of synthesizing outputs of the plurality of unit models UM.

Referring to FIG. 8, the lithofacies estimation model having the CNN-ensemble structure has a structure configured to decide a final lithofacies estimation model by synthesizing estimated lithofacies output by the plurality of unit models UM. A plurality of unit models UM is provided depending on the number of train data sets TS. For example, FIG. 8 shows three unit models UM, such as a first unit model UM-1, a second unit model UM-2, and a third unit model UM-3. However, the present invention is not limited as to the number of unit models UM. Each unit model UM is lithofacies estimation model having a CNN structure described with reference to FIG. 5. Each of the unit models UM, such as the first unit model UM-1, the second unit model UM-2, and the third unit model UM-3, is lithofacies estimation model having a CNN structure described with reference to FIG. 5.

The plurality of unit models UM is trained using a plurality of train data sets TS, at least some of which are different from each other. The train data sets TS, at least some of which are different from each other, may be generated using various kinds of sampling in the train data set generation step S11. For example, first train data sets TS-1, second train data sets TS-2, and third train data sets TS-3 include well logs, at least some of which are different from each other. The first unit model UM-1 may be trained using the first train data sets TS-1, the second unit model UM-2 may be trained using the second train data sets TS-2, and the third unit model UM-3 may be trained using the third train data sets TS-3. The first to third train data sets TS-1, TS-2, and TS-3 may be sampled such that the same kind of lithofacies are included in the label data LD. The kind of the lithofacies to be included in the label data LD may be decided based on the kind of lithofacies to be expected as existing in a well at which lithofacies are to be estimated.

The plurality of unit models UM outputs predicted label PL varying for each unit model UM. Since train data sets vary for each unit model UM, at least some of learned information vary. Even in the case in which the same unseen data UD are input, therefore, different predicted label PL may be output. Referring to FIG. 8, it can be seen that probabilities of the lithofacies corresponding to lithofacies A to E at 588 m, which is a target measured depth of first predicted label PL-1, second predicted label PL-2, and third predicted label PL-3, are different from each other.

The predicted label PL of the plurality of unit models UM are synthesized so as to output lithofacies through an ensemble process. In the ensemble process, lithofacies is decided by synthesizing predicted label PL of the plurality of unit models UM using a majority voting method. The ensemble process using the majority voting method may be expressed by Mathematical Expression 1 below.

$$F(x)=\mathrm{MODE}\{\forall\, t\in T,\ f_t(x)\} \quad \text{[Mathematical Expression 1]}$$

($f_t(x)$: estimated lithofacies output by unit models, t: unit model UM number, T: total number of unit models UM, and F(x): final lithofacies)

The ensemble process using the majority voting method will be described by way of example with reference to FIG. 8. Each of the unit models UM of FIG. 8 may decide lithofacies having the highest probability in the predicted label PL thereof as an estimated lithofacies, as described with reference to FIG. 5. Consequently, the estimated lithofacies decided by the first unit model UM-1 is lithofacies E, which has the highest probability in the first predicted label PL-1, the estimated lithofacies decided by the second unit model UM-2 is lithofacies E, which has the highest probability in the second predicted label PL-2, and the estimated lithofacies decided by the third unit model UM-3 is lithofacies D, which has the highest probability in the third predicted label PL-3. Since most of the estimated lithofacies decided by the unit models UM are lithofacies E, lithofacies E is decided as a final lithofacies in the ensemble process.

Figure 9:
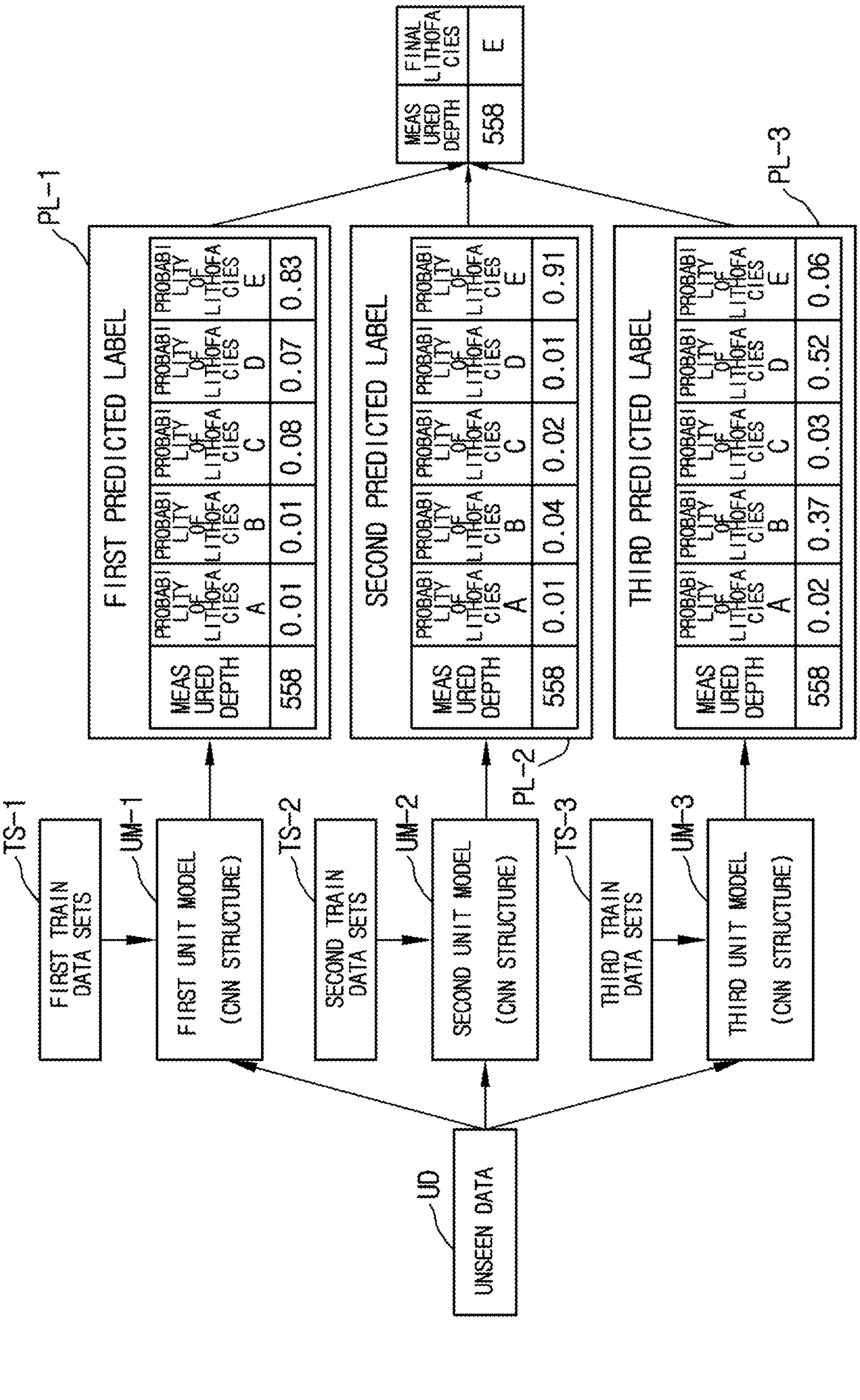
FIG. 9 is a view showing lithofacies estimation model in which an ensemble method is different in the CNN-ensemble structure of FIG. 8.

FIG. 9 is a view showing lithofacies estimation model in which an ensemble method is different in the CNN-ensemble structure of FIG. 8.

In an ensemble process of synthesizing predicted label PL of a plurality of unit models UM, lithofacies estimation probability predicted label PL of each unit model UM are added up for each lithofacies, and the total sum is adjusted so as to be 1, and lithofacies having the highest probability is decided as an estimated lithofacies. This is an ensemble process using a soft voting method, which may be expressed by Mathematical Expression 2 below.

$$F(x)=\mathrm{argmax}\{\forall\, i\in N,\ P_i(x)\} \quad \text{[Mathematical Expression 2]}$$

$$P_i(x)=\sum_{j=1}^{T} w_{ji} f_j(x)$$

($f_j(x)$: probability of each lithofacies in predicted label PL output by unit models, j: unit model UM number, T: total number of unit models UM, $w_{ji}$: weight, i: lithofacies number, $P_i(x)$: probability as i-th lithofacies, N: total number of lithofacies, and F(x): final lithofacies)

The ensemble process using the soft voting method will be described by way of example with reference to FIG. 9.

Each of the unit models UM of FIG. 9 outputs predicted label PL indicating a probability of the strata at the target measured depth corresponding to the lithofacies included in the train data sets TS, as described with reference to FIG. 5. In the ensemble process, the probability of lithofacies E is the highest as the result of synthesizing the probability of each lithofacies in the first to third predicted label PL-1, OD-2, and OD-3 output by the unit models UM, and therefore lithofacies E is decided as a final lithofacies in the ensemble process.

As described above with reference to FIGS. 8 and 9, the lithofacies estimation model having the CNN-ensemble structure according to the embodiment of the present invention may estimate a final lithofacies by synthesizing outputs of a plurality of unit models UM trained using train data sets TS, at least some of which are different from each other, through the ensemble process. In the lithofacies estimation model having the CNN-ensemble structure, accuracy may be improved in a process of synthesizing predicted label PL of a plurality of unit models UM, compared to estimation of lithofacies using only lithofacies estimation model having a CNN structure.

Figure 10:
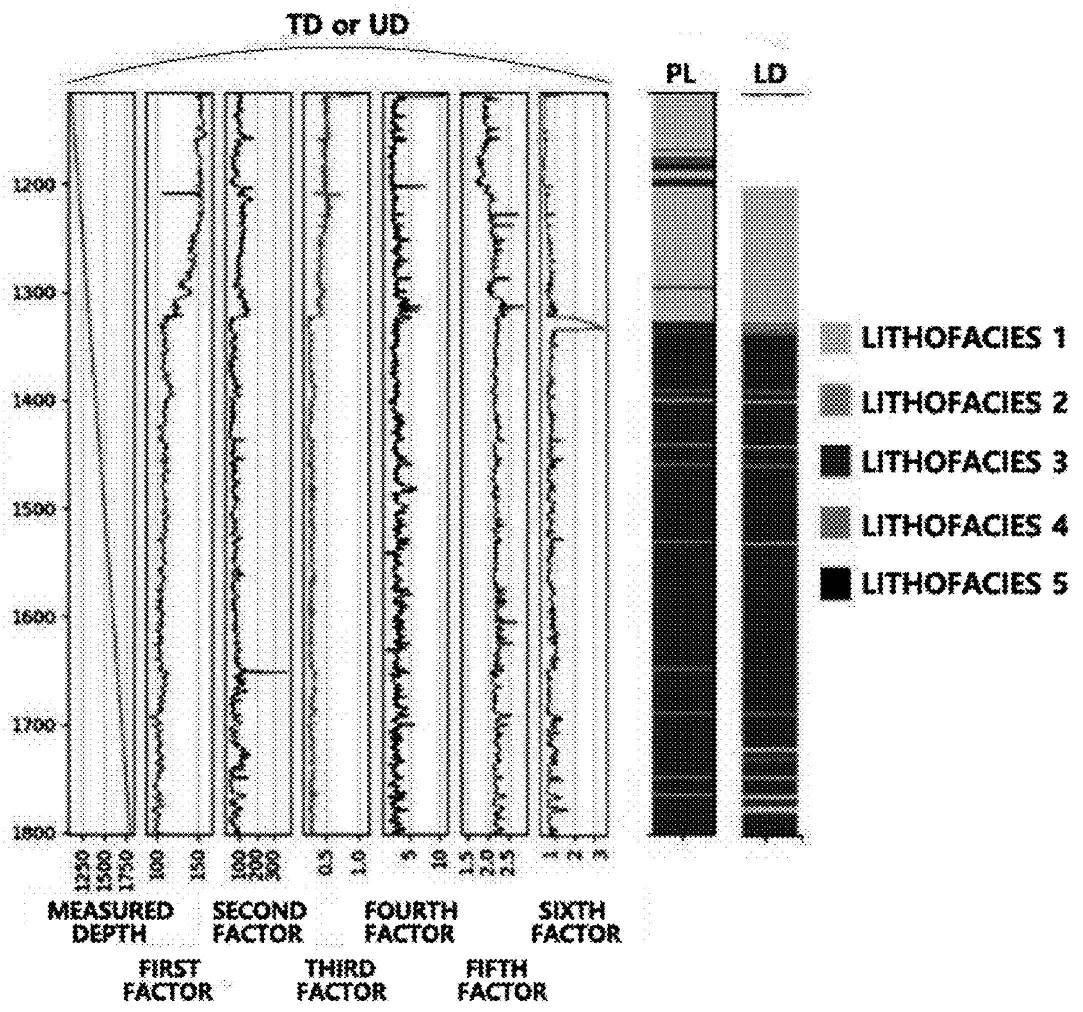
FIG. 10 is a visual chart showing input and output of the lithofacies estimation model having the CNN-ensemble structure according to the embodiment of the present invention.

FIG. 10 is a visual chart showing input and output of the lithofacies estimation model having the CNN-ensemble structure according to the embodiment of the present invention. The left part of FIG. 10 shows well logs corresponding to train data TD or unseen data UD, and the right part of FIG. 10 shows predicted label PL of the lithofacies estimation model and label data LD, which are compared with the predicted label PL.

As shown in FIG. 10, a visual chart showing lithofacies may be prepared by the lithofacies estimation unit 160, and may be visually provided through the input and output unit 170. The lithofacies estimation unit 160 may generate a visual chart visually showing an estimated lithofacies or a final lithofacies output from the lithofacies estimation model as the result of unseen data UD being input to the lithofacies estimation model using colors or patterns. The visual chart may show at least one of train data TD, label data LD, test data, or predicted label PL corresponding to measured depth or for each well. In FIG. 10, it can be seen that the kind of lithofacies learned by the lithofacies estimation model is five, such as lithofacies 1 to lithofacies 5, and strata at most measured depths are estimated as lithofacies 1 and 3. The model selection unit 140 may generate a visual chart as shown in FIG. 10 such that people can visually recognize accuracy of the lithofacies estimation model.

The error correction unit 150 may perform an error correction step of correcting an estimated error. In the case in which lithofacies set as similar lithofacies exist in the estimated lithofacies output by the lithofacies estimation model, similarity of well logs at measured depths corresponding to the similar lithofacies may be examined and that the estimated lithofacies is one of the similar lithofacies may be decided in the error correction step. Similarity of well logs may be determined by calculating Euclidean distance. For example, in the case in which shale and tight sand having low porosity may be set as similar lithofacies, when the lithofacies estimated by the lithofacies estimation model is shale, the error correction step may be performed in order to determine whether tight sand having low porosity is falsely distinguished or not. The error correction unit 150 compares well logs at a measured depth estimated as shale with well logs at a measured depth estimated as other shale and with well logs at a measured depth estimated as tight sand having low porosity, and selects lithofacies having short Euclidean distance.

As described above, in a method and apparatus for estimating lithofacies by learning well logs according to an embodiment of the present invention, in order to learn and estimate lithofacies in strata at a target measured depth, not only well logs measured at the target measured depth learned but also information about well logs measured at a measured depth shallower than the target measured depth and information about well logs measured at a measured depth deeper than the target measured depth are learned. Consequently, it is possible to more accurately estimate the lithofacies at the target measured depth, and therefore drill to the measured depth within the well, based on the existence of determined subsurface natural resources. In order to learn information about strata above/under the target measured depth, as described above, train data sets TS having a two-dimensional matrix structure is generated, and an ensemble process is further performed using lithofacies estimation model having a CNN structure and/or lithofacies estimation model having a CNN-ensemble structure capable of effectively learning the train data sets TS having the two-dimensional matrix structure. Consequently, an optimal lithofacies estimation model is constructed.

Also, in the method and apparatus for estimating the lithofacies by learning the well logs according to the embodiment of the present invention, a plurality of train data sets TS, at least some of which are different from each other, is generated using various sampling methods, lithofacies estimation models having various structures are trained, performance of a plurality of lithofacies estimation models different in at least one structure from the train data sets TS is evaluated, and lithofacies estimation model having the highest performance is selected. Consequently, it is possible to effectively analyze well logs acquired from a well at which lithofacies are to be estimated, whereby it is possible to accurately estimate the lithofacies. Based on the estimated lithofacies, a user can drill to a measured depth within the well, based on the existence of determined subsurface natural resources.

As is apparent from the above description, according to an embodiment of the present invention, it is possible to accurately and rapidly predict lithofacies using an artificial intelligence model that has learned well logs.

Although the present invention has been described in detail with reference to the embodiments, the embodiments are provided to describe the present invention in detail, the tube connector for medical treatment according to the present invention is not limited thereto, and those skilled in the art will appreciate that various modifications, additions and substitutions are possible, without departing from the scope and spirit of the invention as disclosed in the accompanying claims.

Simple changes and modifications of the present invention are to be appreciated as being included in the scope and spirit of the invention, and the protection scope of the present invention will be defined by the accompanying claims.

What is claimed is:

1. A method of estimating lithofacies by learning well logs, the method comprising:

a model formation step of forming lithofacies estimation model to output lithofacies corresponding to measured depth when the well logs are input based on train data sets comprising train data having values of multiple factors included in the well logs, the values being arranged corresponding to measured depth, and label data having lithofacies corresponding to measured depth as answers;

lithofacies estimation step of inputting unseen data having values of multiple factors included in well logs acquired from a well at which lithofacies are to be estimated, the values being arranged corresponding to measured depth, to the lithofacies estimation model to estimate lithofacies corresponding to measured depth, wherein the model formation step and the lithofacies estimation step are driven by a processor, wherein the model formation step comprises:

a train data set generation step of generating train data sets by generating train data having measured values of the multiple factors included in the well logs corresponding to a target measured depth, a measured depth shallower than the target measured depth, and a measured depth deeper than the target measured depth, the measured values being disposed in a two-dimensional array structure, and generating label data having lithofacies at the target measured depth as answers;

a model training step of training lithofacies estimation model having a convolution neural network structure configured to output a probability of the lithofacies at the target measured depth corresponding in kind to the lithofacies included in the label data of the train data sets for each kind of lithofacies using the train data sets and to decide lithofacies having highest probability as an estimated lithofacies, wherein the two-dimensional array structure comprises:

the measured depth located in a first column; and one or more factors located in subsequent columns, wherein the measured depth is arranged in odd-numbered rows with the target depth placed at the center, and the measured depth is arranged in order, wherein the lithofacies estimation model learns information about strata at the target measured depth and learns information about strata shallower than the target measured depth and strata deeper than the target measured depth, and wherein the lithofacies estimation step comprises:

a unseen data generation step of generating unseen data having measured values of the multiple factors included in the well logs corresponding to the target measured depth, the measured depth shallower than the target measured depth, and the measured depth deeper than the target measured depth, the measured values being disposed in a two-dimensional array structure based on the well logs acquired from the well at which lithofacies are to be estimated;

a model use step of outputting a probability of lithofacies at the target measured depth corresponding in kind to the lithofacies included in the label data of the train data sets for each kind of lithofacies as a result of inputting the unseen data to the lithofacies estimation model and deciding lithofacies having highest probability as an estimated lithofacies;

a transmission step of transmitting the estimated lithofacies to a user;

a determining step of determining, by the user based on the transmitted estimated lithofacies from the lithofacies estimation step, the existence of subsurface natural resources at the measured depth within the well; and a drilling step of drilling to the measured depth within the well, based on the existence of subsurface natural resources determined in the determining step.

2. The method according to claim 1, further comprising:

an error correction step of, in a case in which lithofacies set as similar lithofacies exist in the estimated lithofacies output by the lithofacies estimation model, examining similarity of well logs at measured depths corresponding to the similar lithofacies and deciding that the estimated lithofacies is one of the similar lithofacies, wherein the error correction step compares well logs at a measured depth estimated as estimated lithofacies with well logs at a measured depth estimated as other estimated lithofacies and with well logs at a measured depth estimated as similar lithofacies, and selects lithofacies having short Euclidean distance, and wherein the error correction step is driven by a processor.

3. A method of estimating lithofacies by learning well logs, the method comprising:

a model formation step of forming lithofacies estimation model to output lithofacies corresponding to measured depth when the well logs are input based on train data sets comprising train data having values of multiple factors included in the well logs, the values being arranged corresponding to measured depth, and label data having lithofacies corresponding to measured depth as answers; and lithofacies estimation step of inputting unseen data having values of multiple factors included in well logs acquired from a well at which lithofacies are to be estimated, the values being arranged corresponding to measured depth, to the lithofacies estimation model to estimate lithofacies corresponding to measured depth, wherein the model formation step and the lithofacies estimation step are driven by a processor, wherein the model formation step comprises:

a train data set generation step of generating train data sets comprising train data having values of the multiple factors included in the well logs, the values being arranged corresponding to measured depth, and label data having lithofacies corresponding to measured depth as answers, wherein a method of sampling data to be included in the train data sets is diversified such that at least some thereof generate another plurality of train data sets;

a model training step of training the lithofacies estimation model to output lithofacies corresponding to measured depth when the well logs are input, wherein lithofacies estimation models having various structures are trained using the plurality of train data sets, at least some of which are different from each other, in order to train a plurality of lithofacies estimation models different in at least one structure from the train data sets; and a model selection step of evaluating performance of the plurality of lithofacies estimation models different in at least one structure from the train data sets and selecting lithofacies estimation model having highest performance, wherein the train data set generation step comprises generating a plurality of train data sets comprising a plurality of well logs, at least some of which are different from each other, by performing at least one of:

optimal rate sampling for generating a plurality of train data sets at various rates in order to determine an optimal rate of data to be used as train data sets and data to be used as test data in the well logs;

uniform lithofacies sampling for selecting data such that lithofacies rates of well logs included in the train data sets are uniform;

random repetitive sampling for randomly extracting data from one or more well logs, wherein a determination is made as to whether each lithofacies included in finally extracted data exists at more than a predetermined rate and, in a case in which a specific lithofacies is included at less than the predetermined rate, extraction of data is repeated;

similar pattern sampling for extracting, in well units, well logs having a pattern similar to a pattern of a value of a specific factor of the well logs acquired from the well at which lithofacies are to be estimated in order to generate train data sets;

cluster sampling for selecting well logs acquired from a well belonging to a cluster predicted to have strata similar to strata of the well at which lithofacies are to be estimated in order to generate train data sets; or depth factor sampling for differently selecting a range of measured depths and a number and kind of factors included in train data sets configured to have a two-dimensional array structure;

a transmission step of transmitting the estimated lithofacies to a user;

a determining step of determining, by the user based on the transmitted estimated lithofacies from the lithofacies estimation step, the existence of subsurface natural resources at the measured depth within the well; and a drilling step of drilling to the measured depth within the well, based on the existence of subsurface natural resources determined in the determining step.

4. The method according to claim 3, wherein the lithofacies estimation model has a CNN-ensemble structure comprising a plurality of unit models, each of which has a convolution neural network structure and at least some of which have been trained using another plurality of train data sets, and an ensemble process of synthesizing outputs of the plurality of unit models.

5. An apparatus for estimating lithofacies by learning well logs, the apparatus comprising:

a well log database (DB) configured to store well logs, which are data acquired through measurement and analysis after drilling on strata, and lithofacies corresponding to measured depth;

a train data set generation unit configured to generate train data sets comprising train data having values of multiple factors included in the well logs, the values being arranged corresponding to measured depth using data stored in the well log DB, and label data having lithofacies corresponding to measured depth as answers;

a model training unit configured to train lithofacies estimation model to output lithofacies corresponding to measured depth when the well logs are input using the train data sets generated by the train data set generation unit; and lithofacies estimation unit configured to input unseen data having values of multiple factors included in well logs acquired from a well at which lithofacies are to be estimated, the values being arranged corresponding to measured depth, to the lithofacies estimation model trained by the model training unit in order to estimate lithofacies corresponding to measured depth, wherein the train data sets and the unseen data are measured values of the multiple factors included in the well logs corresponding to a target measured depth, a measured depth shallower than the target measured depth, and a measured depth deeper than the target measured depth, the measured values being disposed in a two-dimensional array structure based on the well logs acquired from the well at which lithofacies are to be estimated, and the lithofacies estimation model has a convolution neural network structure configured to output a probability of the lithofacies at the target measured depth corresponding in kind to the lithofacies included in the label data of the train data sets for each kind of lithofacies using the train data sets and to decide lithofacies having highest probability as an estimated lithofacies, wherein the two-dimensional array structure comprises:

the measured depth located in a first column; and one or more factors located in subsequent columns, wherein the measured depth is arranged in odd-numbered rows with the target depth placed at the center, and the measured depth is arranged in order, wherein the lithofacies estimation model learns information about strata at the target measured depth and learns information about strata shallower than the target measured depth and strata deeper than the target measured depth, and wherein the train data set generation unit, the model training unit, and the lithofacies estimation unit are realized as program code and driven by a processor; and a display configured to transmit the estimated lithofacies to a user, wherein the user can determine, based on the transmitted estimated lithofacies from the lithofacies estimation unit, the existence of subsurface natural resources at the measured depth within the well, such that the user can drill to the measured depth within the well, based on the existence of subsurface natural resources determined in the determining step.

6. The apparatus according to claim 5, further comprising:

an error correction unit configured, in a case in which lithofacies set as similar lithofacies exist in the estimated lithofacies output by the lithofacies estimation model, to examine similarity of well logs at measured depths corresponding to the similar lithofacies and to decide that the estimated lithofacies is one of the similar lithofacies, wherein the error correction unit compares well logs at a measured depth estimated as estimated lithofacies with well logs at a measured depth estimated as other estimated lithofacies and with well logs at a measured depth estimated as similar lithofacies, and selects lithofacies having short Euclidean distance, and wherein the error correction unit is realized as program code and driven by a processor.

7. An apparatus for estimating lithofacies by learning well logs, the apparatus comprising:

a well log database (DB) configured to store well logs, which are data acquired through measurement and analysis after drilling on strata, and lithofacies corresponding to measured depth;

a train data set generation unit configured to generate train data sets comprising train data having values of multiple factors included in the well logs, the values being arranged corresponding to measured depth using data stored in the well log DB, and label data having lithofacies corresponding to measured depth as answers;

a model training unit configured to train lithofacies estimation model to output lithofacies corresponding to measured depth when the well logs are input using the train data sets generated by the train data set generation unit; and lithofacies estimation unit configured to input unseen data having values of multiple factors included in well logs acquired from a well at which lithofacies are to be estimated, the values being arranged corresponding to measured depth, to the lithofacies estimation model trained by the model training unit in order to estimate lithofacies corresponding to measured depth, wherein the train data set generation unit generates train data sets comprising train data having values of the multiple factors included in the well logs, the values being arranged corresponding to measured depth, and label data having lithofacies corresponding to measured depth as answers, wherein a method of sampling data to be included in the train data sets is diversified such that at least some thereof generate another plurality of train data sets, the model training unit trains the lithofacies estimation model to output lithofacies corresponding to measured depth when the well logs are input, wherein lithofacies estimation models having various structures are trained using the plurality of train data sets, at least some of which are different from each other, in order to train a plurality of lithofacies estimation models different in at least one structure from the train data sets, and the apparatus further comprises a model selection unit configured to evaluate performance of the plurality of lithofacies estimation models different in at least one structure from the train data sets and to select lithofacies estimation model having highest performance, wherein the train data set generation unit, the model training unit, the lithofacies estimation unit, and the model selection unit are realized as program code and driven by a processor, wherein the train data set generation unit generates a plurality of train data sets comprising a plurality of well logs, at least some of which are different from each other, by performing at least one of:

optimal rate sampling for generating a plurality of train data sets at various rates in order to determine an optimal rate of data to be used as train data sets and data to be used as test data in the well logs;

uniform lithofacies sampling for selecting data such that lithofacies rates of well logs included in the train data sets are uniform;

random repetitive sampling for randomly extracting data from one or more well logs, wherein a determination is made as to whether each lithofacies included in finally extracted data exists at more than a predetermined rate and, in a case in which a specific lithofacies is included at less than the predetermined rate, extraction of data is repeated;

similar pattern sampling for extracting, in well units, well logs having a pattern similar to a pattern of a value of a specific factor of the well logs acquired from the well at which lithofacies are to be estimated in order to generate train data sets;

cluster sampling for selecting well logs acquired from a well belonging to a cluster predicted to have strata similar to strata of the well at which lithofacies are to be estimated in order to generate train data sets; or depth factor sampling for differently selecting a range of measured depths and a number and kind of factors included in train data sets configured to have a two-dimensional array structure; and the apparatus further comprises a display configured to transmit the estimated lithofacies to a user, wherein the user can determine, based on the transmitted estimated lithofacies from the lithofacies estimation unit, the existence of subsurface natural resources at the measured depth within the well, such that the user can drill to the measured depth within the well, based on the existence of subsurface natural resources determined in the determining step.

8. The apparatus according to claim 7, wherein the lithofacies estimation model has a CNN-ensemble structure comprising a plurality of unit models, each of which has a convolution neural network structure and at least some of which have been trained using another plurality of train data sets, and an ensemble process of synthesizing outputs of the plurality of unit models.

* * * * *